3,517,522
DEVICE FOR AUTOMATICALLY ADJUSTING CONCENTRATION OF ABSORBENT SOLUTION

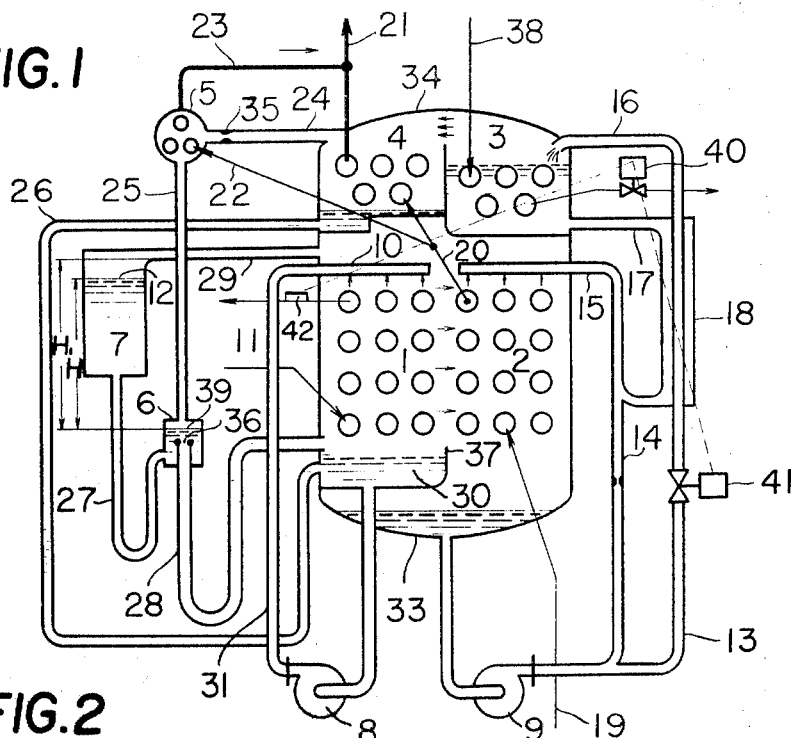
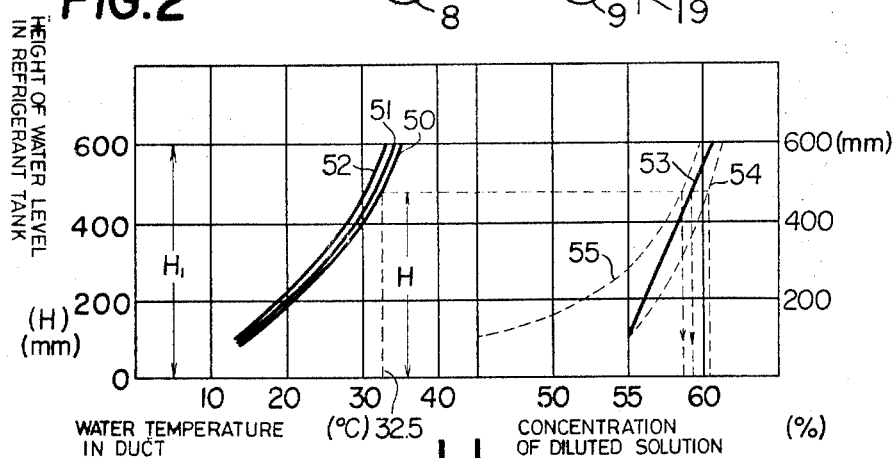
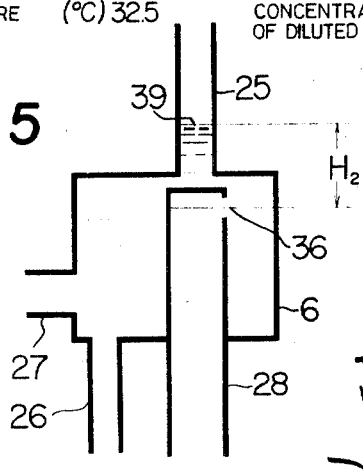

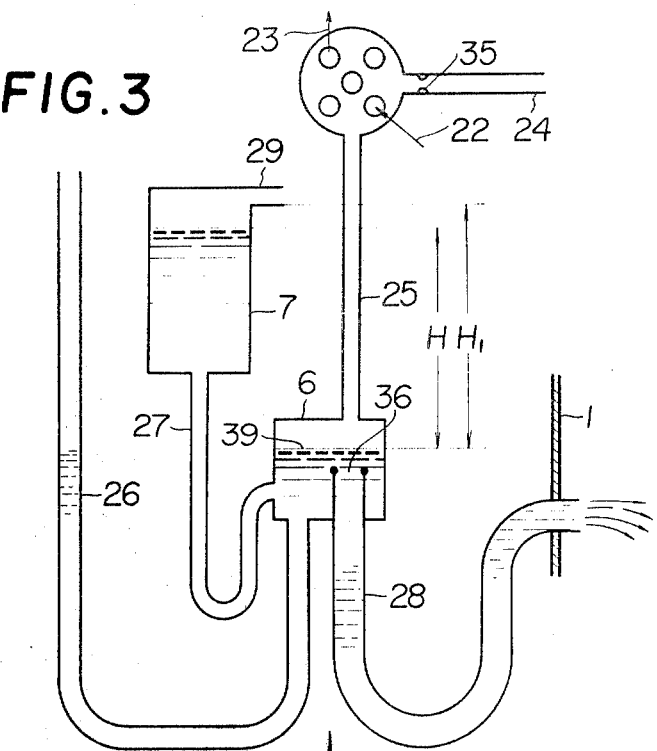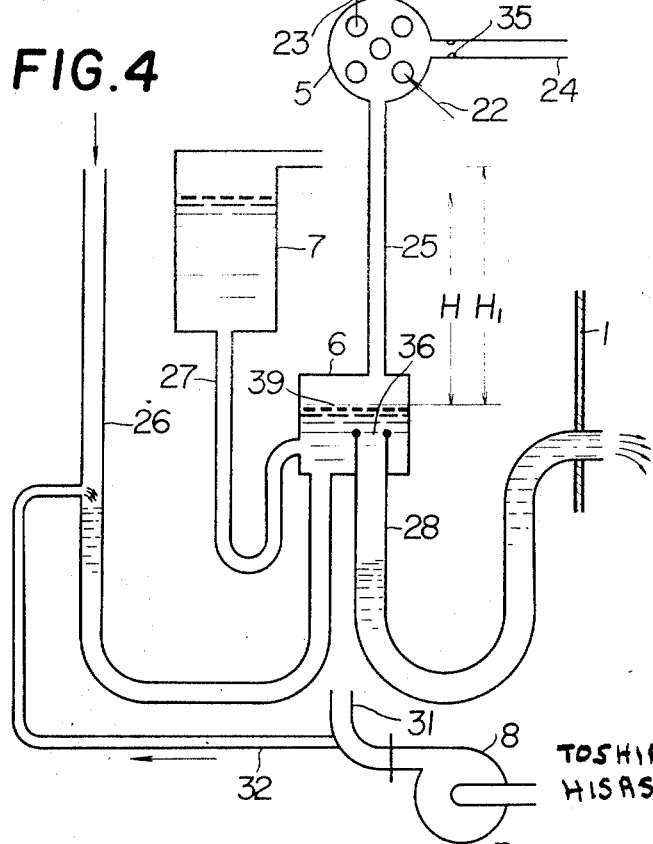

Toshiro Ozono, Hyogo-ken, and Hisashi Matsushima, Osaka-fu, Japan, assignors to Kishaseizo Kabushiki Kaisha, Tokyo, Japan
Filed Oct. 11, 1968, Ser. No. 766,714
Int. Cl. F25b 15/00
U.S. Cl. 62—141                                13 Claims

ABSTRACT OF THE DISCLOSURE

A device for automatically adjusting the concentration of an absorbent solution used in an absorption refrigerator, involves controlling the amount of absorbent solution supplied to the generator of the refrigerator in response to a signal from a sensing device which checks the outlet temperature of the cooling water discharged from the evaporator of the refrigerator. Further, a concentration adjusting condenser supplies refrigerant into a leveling tank which in turn supplies the refrigerant into the evaporator section of the refrigerator through a U-shaped conduit or through an accumulating tank.

SUMMARY OF THE INVENTION

The present invention relates to a device for automatically adjusting the concentration of an absorbent solution in an absorption refrigerator employing water as the refrigerant and an aqueous solution of lithium bromide as the absorbent solution.

In an absorption refrigerator employing an aqueous solution of lithium bromide as the absorbent, an excessively low concentration of the absorbent solution will result in a decrease of the refrigeration effect, while too high a concentration thereof will cause trouble in operation by way of crystallization of the absorbent solution. Moreover, the concentration of the absorbent solution has to be maintained properly at all times, while the refrigerator is in operation, relative to such conditions as the temperature of the cooling water and the variable quantity thereof, the extent of fouling within the tubes for the cooling water, the temperature of chilled water and the refrigerating load ratio. Among the above-mentioned conditions, it is particularly a serious matter where crystallization of the absorbent solution takes place since the refrigerator will be unable to operate in the course of crystallization and during further progress of crystallization, the machine will be damaged.

According to the present invention, an absorbent solution is completely prevented from crystallization in every operating condition of the absorption refrigerator, for instance ranging from permissible low concentration at a low temperature of the solution, that is, at a low temperature of the cooling water and at a low refrigerating load while being maximum in to permissible high concentration at a high temperature of solution, that is, at the high temperature of a cooling water and at a high refrigerating load. In other words, the concentration of the absorbent solution is kept automatically in constant correspondence with its temperature so as not to exceed a predetermined rate of concentration by storing an appropriate quantity of cooling water contained in a circulating absorbent solution and arranged to be automatically separated within a tank which is mounted on the machine at a proper location, taking advantage of a difference in pressure between a high pressure, that is, the pressure of a concentration adjusting condenser determined by the temperature of the cooling water to be fed into the condenser, and a low pressure, that is, the pressure of an evaporator and absorber section, since an aqueous solution of lithium bromide, employed as an absorbent solution in an absorption refrigerator, has a feature of being crystallized in low concentration at a low temperature while being crystallized in high concentration at a high temperature.

In order that the invention may be understood, specific embodiments will now be described by way of example, with reference to the accompanying drawings, in which:

FIG. 1 is a schematic illustration of an absorption refrigerator mounting an automatic adjusting device for regulating the concentration of the absorbent solution relating to the present invention, showing the mechanical system in accordance with the present invention in full line, FIG. 2 is a diagram showing one example of a condition varying in the course of operation of the refrigerator and carried out according to the present invention. FIGS. 3 and 4 are each a schematic view showing another modified embodiment; and FIG. 5 is a partial schematic view illustrating an overflow member for a refrigerant of the modified embodiments shown in FIGS. 3 and 4 respectively.

In FIG. 1, reference numeral 1 designates an evaporator, numeral 2 represents an absorber, numeral 3 denotes a generator and numeral 4 defines a condenser, each of which comprises a multitude of heat exchange tubes, wherein cooling water is adapted to stream through the tubes located within the evaporator 1 and cooling water is adapted to run through the heat exchange tubes installed within the absorber 2 and the condenser 4 respectively, while steam is adapted to pass through the heat exchange tubes provided within the generator 3. The whole device is maintained in a sealed air-tight condition after any air is completely evacuated.

Refrigerant reserved within the reservoir 30 mounted in the evaporator 1 is distributed over the outer periphery of the heat exchange tubes arranged within the evaporator 1 through a distributor system 10 by means of a pump 8 for the refrigerant and is vaporized at the temperature of vaporization which corresponds to the pressure generated in the inner part of the evaporator 1. At that time, by way of the heat of vaporization, chilled water, that is water to be cooled, flowing into the duct 11 to pass through the heat exchange tubes within the evaporator 1 is cooled down further to become effective for refrigeration, the cooled-down water can be utilized for air-conditioning, refrigeration and other service.

Cooling water is adapted to be flowed into the absorber 2 through the duct 19, then from the absorber through the duct 20 into the condenser 4, and from the condenser it is discharged through the duct 21. An absorbent solution in high concentration is cooled down by the action of the cooling water as it flows downward around the outer periphery of the heat exchange tubes arranged within the absorber 2 in order to absorb refrigerant vapour evaporated within the evaporator 1 and to lower the concentration thereof as well as the heat of absorption generated by the action of absorption, which is cooled down by means of the cooling water passing through the heat exchange tubes in the absorber. Diluted absorbent solution of lower concentration is flowed into the generator 3 passing through the duct 13, the heat exchanger 18, and the duct 16 in sequence.

Concentrated absorbent solution, heated and boiled by steam, which is supplied into the generator 3 through the duct 38, is flowed out through the duct 17, and then is treated in heat exchange relationship operation within the heat exchanger 18 with the diluted absorbent solution and is mixed with diluted absorbent solution, which is fed through the duct 14, and is distributed again over the outer periphery of each tubes arranged within the absorber 2 by means of the distribution system 15. Refrigerant vapour, vaporized and separated from the absorbent solution within said generator 3, is flowed into the condenser 4 to be cooled down and condensed by the cooling water, and is fed again into the reservoir 30 of the evaporator 1 passing through the duct 26 which is disposed in the profile of U shape.

Pressure, generated within the lower chamber 33 accommodating the evaporator 1 and the absorber 2 respectively therewithin, is adapted to be variable according to the required temperature of chilled water, the pressure of which is in general at 0.01 kg./cm.$^2$ abs. or thereabout, while the pressure within the upper chamber 34 accommodating the generator 3 and the condenser 4 respectively is adapted to be variable corresponding to the temperature of the cooled water and other factors, the pressure of which is generally at 0.1 kg./cm.$^2$ abs. or thereabout being subjected to higher pressure at all times than that within the lower chamber 33.

Valve 40 serves as an automatic valve for adjusting the quantity of steam discharged from the generator 3, in such a manner as to operate automatically in its opening and closing movement by means of the heat sensor 42 which is sensitive to the chilled water outlet temperature which is chilled within the evaporator 1 in proportion to the temperature of chilled water at the outlet and for regulating the quantity of steam condensed within the generator 3 in order to establish refrigerating function corresponding to the load of refrigeration.

The automatic control valve 40 also has as its function to maintain the constant temperature of chilled water, because the liquid surface of refrigerant within the reservoir 30 is automatically controlled to be raised or lowered for adjusting the concentration of the absorbent solution flowing downward through the absorber 2.

When chilled water has rather a high temperature, for instance, it is influenced to lower its temperature, resulting in an increase in the concentration of the absorbent solution as well as to raise the liquid surface thereof, while chilled water having rather a lower temperature, both the concentration of the absorbent solution as well as liquid surface is lowered. Accordingly, the liquid surface of the refrigerant within the reservoir 30 is intended to be set in such a manner that the highest level is established at the predetermined maximum temperature of chilled water, as the temperature of the chilled water drops below the maximum, that is, load is reduced, then the liquid surface of the refrigerant within the reservoir 30 comes down to dilute the concentration of the absorbent solution, however, to the contrary, when the temperature of the chilled water is increased due to an excess load, the refrigerant within the reservoir 30 overflows above the upper edge 37 of the reservoir 30 for regulating the absorbent solution within the predetermined value of concentration whereby it is inevitable to cause disorder of function for stabilizing the temperature of the chilled water. On one hand, when the temperature of the chilled water is reduced causing no overflowing, that is, the load is reduced and the temperature of cooling water is lowered and the like, the conventional device of this kind generally has the drawback that it causes a rise in the level of the liquid surface which should be in a lower position and the concentration of the absorbent solution is increased up to the value to cause overflowing thereof above the upper edge of the reservoir, and furthermore in some cases, to cause crystallization thereof by means of the following circumstances such as, for instance, inappropriate adjustment of control, disordered vacuum condition, wherein wrong control takes place in operating to unnecessarily raise the concentration than under ordinary condition in accidental cases.

The main object of the present invention is to eliminate the foregoing drawback which has occurred in known devices.

Valve 41 is provided to serve as an automatic valve for adjusting the quantity of diluted absorbent solution to be supplied to the generator 3 and interlocking the valve 40 for automatically operating its opening and closing movement for supplying the absorbent solution in an appropriate quantity relative to the value of load, whereby the efficiency of the refrigeration operation is promoted to be favourable under reduced load conditions.

The object of the present invention resides in providing an automatic adjusting device mounted on an absorption type refrigerator, wherein the maximum concentration of an absorbent solution is regulated automatically within permissible limits from the standpoint of preventing crystallization of the absorbent solution in compliance with the operating conditions whereby trouble caused by crystallization is completely avoided.

The concentration adjusting condenser 5 is comprised of heat exchange tubes having a heat transfer area which is smaller than that within the condenser 4 and an ample amount of cooling water is supplied through the duct 20 directly leading from the absorber 2 to pass a divided flow into the duct 22 of the condenser, then to convey the flow from the condenser through the duct 23 into the duct 21. The concentration adjusting condenser 5 is connected at its outer periphery to the condenser 4 through a duct 24 having an orifice 35 for condensing some part of the refrigerant therewithin. Since the smaller is the diameter of the orifice 35, the lesser will be the quantity of vapour flowing thereinto, the difference in temperature between the condensate and cooling water will be smaller according to principles of heat transfer and, therefore, it becomes fruitful for improving the accuracy of the present mechanism.

The pressure within the concentration adjusting condenser 5 is arranged to be higher than that within the lower chamber 33 and to be lower to some extent than that within the upper chamber 34. The condenser 5 is connected at its bottom through the conduit 25 to the levelling vessel 6 wherein the pressure is equivalent to the pressure generated within the concentration adjusting condenser 5. The levelling vessel 6 is provided with an overflow port 36 for maintaining the liquid surface 39 to be constant and the lower portion of the overflow port 36 is in communication with the lower chamber 33 in lower pressure area through the conduit pipe 28, which is U-shaped for preventing accidental communication between the levelling vessel 6 and the lower chamber 33 by way of difference of pressure. The reference numeral 7 designates the refrigerant accumulating tank, the upper end of which is connected to the lower chamber 33 in lower pressure area through the pressure balancing and overflow pipe 29, while its lower end is connected to the levelling vessel 6 through the conduit pipe 27, and the tank 7 is adapted to keep the liquid surface 12 determined by means of the difference of pressure, that is, the difference of water level represented by H and to reserve an appropriate quantity of refrigerant therein.

The above-mentioned refrigerant is supplied through the levelling vessel 6 into the tank 7 from the concentration adjusting condenser 5 wherein the refrigerant is condensed or into the tank 7 through the pipe 26 or other pipe 31 as is described in an embodiment showing different constitution of mechanism.

An automatic adjustment device for concentration of the absorbent solution according to the present invention is constituted as is mentioned above, the device is available to be mounted either on the lower chamber 33 or on the upper chamber 34 at the inner part or the outer part thereof.

The operation of the automatic adjusting device will now be described in a case where the temperature of the cooling water at the inlet is changeable despite that it is kept constant for the refrigerating load ratio as well as for the quantity of the cooling water shown in FIG. 2, wherein lines 50–52 of the chart represent the relation between the temperature of the chilled water at the inlet of the concentration adjusting condenser 5 (which will be denoted as the temperature of the water in the duct 22 in the following description) and the height of water level H within the refrigerant accumulating tank 7, wherein the line 50 shows the relationship in the case where the fouling factor is disclosed as the numeral zero (0), the line 51 as 0.0001 and the line 52 as 0.0002, respectively.

The pressure in the lower pressure area varies very little due to the nature of vapour even though the temperature of vapour is variable, so that the height of water level H is determined by means of the pressure in higher pressure area only shown in FIG. 2.

According to the chart shown in FIG. 2, in case the temperature of water in the duct 22 is lowered, the pressure within the concentration adjusting condenser 5 is lowered, resulting in very little rise in the height of water level H within the refrigerant tank 7, accordingly is caused the water to be mixed within the usual refrigerating cycle in the quantity equivalent to the decreased quantity of reserved water within the tank, on the other hand, the pressure within the concentration adjusting condenser 5 increases in case the temperature of water in the duct 22 is increased whereby a considerable rise in the height of water level H within the tank 7 takes place as well as an increase in the quantity of the reserved water, which is effected for discharging the water in a quantity equivalent to the increased quantity of reserved water from the refrigerating cycle.

The dotted line 54 represents the critical concentration for crystallization which is converted for the sake of indication, to concentration for diluted solution, this concentration is meant to be diluted after absorbing the refrigerant, and the dotted line 55 shows the relation with a model concentration of diluted solution, for instance, in case the temperature of water in the duct 22 is at 32.5° C. and fouling factor is at 0, and the height of water level being raised up to 460 mm., the critical concentration for crystallization becomes at 60.5% and the ideal concentration comes to 58%. According to the present invention, the permissible maximum concentration will be obtained within the range between these two lines.

The full line 53 is an actual example carried out according to the present invention when the minimum concentration of diluted solution is at 55% and the maximum concentration of diluted solution at 60.5%, it has begun to be accumulated within the refrigerant tank 7 at the height showing 100 mm. of water level H, and when the temperature of water in the duct 22 is raised up to 36.5° C. and fouling factor shows at 0 indicated by the line 50, the height of water level is displaced upward to 600 mm. ($H_1$), see FIG. 1, to fill the tank. When the temperature of water is increased beyond 36.5° C., the refrigerant within the refrigerant tank 7 will overflow, whereby the function relating to the present invention will be out of the bounds.

The difference between the ideal concentration indicated by the dotted line 55 and the actual concentration indicated by the full line 53 is adjusted automatically by the controlled displacement of the water level within the refrigerant reservoir 30.

The above-mentioned description is for the operation of the device in the case where the quantity of chilled water and load ratio is set under constant condition respectively and, in such foregoing condition it is not necessary to provide forcibly an automatic concentration adjusting condenser 5, but it will be sufficient for operation to apply the temperature of the chilled water at the inlet or at the outlet, or else simply by employing the pressure within the condenser in a higher pressure area.

The characteristic feature of the present invention is to provide specifically the condenser 5 for automatically adjusting concentration, whereby the function thereof will be adapted for such condition as alteration of load, variation in quantity of chilled water, or fouling which occurs within the tubes.

For an example, in case the load is reduced, the temperature of cooling water flowing through the absorber will become reduced in the range of ascent which causes a reduction in the temperature of the water within the duct 22 connected to the concentration adjusting condenser 5 as well as a decrease in the accumulating quantity of refrigerant, and also a reduction in the maximum concentration. In case of reduced load conditions, the concentration of the absorbent solution is, on one hand, lowered and, furthermore, the absorbent solution is severely cooled down, causing a reduction of the concentration for crystallization. As a consequence of the reduction of the maximum concentration, due to the process carried out according to the device, favourable results are obtained in case of reduced load conditions.

When the cooling water flowing through the duct 19 is at a low temperature, it may be operated in the condition of a reduced quantity of cooling water in the range of a relatively lower temperature of cooling water flowing out through the duct 21. In such case, the absorbent solution is at a lower temperature within the absorber 2, so that it will be good enough at low concentration. As the concentration for crystallization, however, is lowered the temperature of water in the duct 22 is advantageously lower, and thus it is advantageous that the upper limit of the concentration is suitably lowered.

In the event, a lesser quantity of cooling water causes a remarkable rise in the temperature of the cooling water even though it is under reduced load conditions, however, in such a case, the reduced load condition causes a decrease in the concentration for crystallization, since the temperature of the absorbent solution is reduced. A rise in the temperature of the water passing through the duct 22, on one hand, is not so great and the maximum concentration thereof will not become that high to approach the concentration for crystallization.

On the other hand, with the temperature of cooling water be settled down at the outlet be settled down in constant condition and quantity, the temperature of water in the duct 22 connected to the concentration adjusting condenser 5 is increased to cause the maximum concentration to vary to a higher degree in the case of increased load condition, while under reduced load condition, the temperature of water in the duct 22 is lowered to cause the maximum concentration to vary to a reduced degree.

It is favourable in the light of necessity, to establish lower concentrations in the case of reduced load conditions while obtaining higher concentrations in the case of increased load conditions.

In a similar case, such as with the temperature of the cooling water at the inlet stabilized and the quantity of the water increased, the absorbent solution is subjected to a substantial cooling action within the absorber 2 to a temperature as well as to a reduction in the temperature of the cooling water in the duct 22, similarly, the concentration for crystallization of the absorbent solution in cycle is reduced, so that the maximum concentration is favourably decreased to an appropriate condition. In the event the quantity of water is decreased, the absorbent solution will not be cooled down too much, and the concentration for crystallization in the cycle is consequently increased. The temperature of water in the duct 22 rises whereby the maximum concentration is properly increased.

Furthermore, due to the concentration adjusting condenser 5 specifically mounted on the refrigerator, optionally an enlarging heat surface area can be effected in proportion to quantity of vapour flowing through the orifice 35, so that the full lines 50, 51 and 52 shown in FIG. 2, can easily be placed close to one another and no variation in temperature for condensation is caused irrespective of fouling within the tubes, consequently, there is very little variation in the reserved quantity of the water; whereby a great advantage is achieved where there is no influence from fouling.

In accordance with the present invention, the refrigerating cycle can be constituted within the range of operating conditions, wherein the maximum concentration for crystallization is shown by the dotted lines 54 and 55 respectively, that is, in any operating condition, the maximum concentration of the absorbent solution is always limited to a proper value, thereby avoiding any problems due to crystallization of the absorbent solution.

Up to the present day, the method usually adopted has been such as to maintain the temperature of the cooling water above a constant value in order to assure the absorbent solution does not crystallize, because no process similar to the present invention was known. According to the present invention, however, the foregoing method is obviated and the equipment is reduced to a simple construction. Moreover, due to frequent opportunities for reducing the temperature of the cooling water, the present invention has improved the efficiency of the refrigerating cycle, as well as preventing crystallization in the event of changes in the refrigerating load, variations in the quantity of cooling water, fouling within the tubes and so on. Another modification of the present invention is shown in FIG. 3.

In the first embodiment disclosed in FIG. 1, refrigerant condensed within the condenser 4 is passed downwardly through the pipe 26 and is discharged directly into the evaporator 1, while refrigerant condensed within the condenser 4, not shown, is adapted to pass through the pipe 26 into the levelling vessel 6 and then through the conduit pipe 27 flowing into the refrigerant tank 7, as shown in FIG. 3, in case it is to be accumulated within said tank 7. When a variance in pressure is balanced within the tank, the refrigerant is confluent with other refrigerant passing through the conduit pipe 25 and is discharged into the evaporator 1 passing into the seal pipe 28 through the overflow port 36. If a lesser quantity of the refrigerant passes through the conduit pipe 25 from the concentration adjusting condenser 5 in proportion to the velocity for generating a difference of pressure in the higher pressure area compared to the lower pressure area due to variable operating conditions, the velocity of the cooling medium accumulated within the refrigerant tank 7 will be reduced and it will take rather a long time to achieve stabilized operating conditions, so that the pipe 36 is connected to the levelling vessel 6 for accelerating the accumulating velocity by supplying the refrigerant condensed within the condenser 4.

Description for constitution, operation and principles of the foregoing modification will be eliminated because of similarity to those of the former embodiment disclosed in FIG. 1.

A further modification of the present invention is illustrated in FIG. 4.

A new conduit pipe 32 branched from the pipe 31 is connected to an appropriate portion of the pipe 26, shown in FIG. 3. Cooled refrigerant, circulated by the action of the refrigerant pump 8, is flowed into pipe 26 and is mixed with the other refrigerant which has a slightly higher temperature than the former and comes from the condenser 4, the confluent cooling medium is passed through the pipe 26 and the seal pipe 28, and is adapted to have a reduced temperature to prevent the development of bubbles caused by flushing which tends to take place at the higher temperatures thereof, and to increase the apparent specific gravity, whereby the lengths of the pipes 26, 28 are shortened respectively.

Due to the increase in the quantity of the refrigerant entering into the levelling vessel 6 under the foregoing embodiment the accumulating velocity within the refrigerant tank 7 is accelerated further in proportion to the one operated within the prior modification shown in FIG. 3 resulting in stabilized operating conditions being maintained at all times, wherein no excess drop in water level of the levelling vessel will take place by determining appropriate the quantity of refrigerant to be passed through the new conduit pipe 32, even though rapid variations in pressure are generated.

Description for constitution, operation and principles of the foregoing modification will be eliminated because of similarity to those of the prior modification shown in FIG. 3.

In FIG. 5 a portion of the refrigerant overflow part contained in the foregoing two respective modifications is illustrated.

Refrigerant flowing downwardly through the conduit 25 and the other refrigerant passing through the pipe 26, both of which enter into the levelling vessel 6, and then pass through the seal pipe 28 keeping the head $H_2$ from the overflowing port 36, just the same way as is described in FIGS. 1, 3 and 4, however, in FIG. 5, the head $H_2$ is always positioned within the conduit 25 so as to prevent the diameter of the aperture provided on the overflow port 36 from lowering the position of the head $H_2$.

In the event the head $H_2$ is lowered within the levelling vessel 6, the contact area of the vapour with the liquid surface will be increased, and when the temperature of the water within the levelling vessel 6 is lower than that of the vapour, condensation will take place within the levelling vessel causing a reduction in the pressure therewithin, while if the temperature of the water within the levelling vessel 6 is higher than that of vapour, evaporation will be taken place within the vessel causing an increase in the pressure therewithin, such variation in pressure will result in the unstability of the pressure generated within the concentration adjusting condenser 5. Therefore, the head $H_2$ is maintained, in the conduit 25, at all times, and, having a smaller diameter, its influence due to condensation and evaporation at its contact surface could be ignored. Of course the extent of such influence will be related to the dimension of the concentration adjusting condenser and of the orifice 35.

The arrangement shown in the accompanying drawings can be employed with the refrigerant overflowing port 36 in case a difference of pressure is to be detected precisely, and the variation of pressure influenced by condensation and evaporation has to be taken into account due to the larger area of the levelling vessel 6.

Although the present invention has been described in conjunction with preferred embodiment, it is to be understood that the modifications and variations shown in the drawings may be resorted to without departing from the spirit and scope of the invention, as those skilled in the art will readily understand. Such modifications and variations are considered to be within the purview and scope of the invention.

What is claimed is:

1. A device in an absorption refrigerator for automatically adjusting the concentration of an absorbent solution in the refrigerant, the absorption refrigerator comprising a housing divided into a lower chamber and an upper chamber, said upper chamber arranged to operate under a higher pressure than said lower chamber, an evaporator and an absorber located within said lower chamber, a generator and a condenser located within said upper chamber, first means located within said housing for passing the refrigerant in indirect heat transfer relationship with another fluid in said evaporator, absorber, generator and condenser therein, a concentration adjusting condenser spaced from said housing and being in communication with the refrigerant within said condenser in said upper chamber whereby the pressure within said concentration adjusting condenser is higher than that in said lower chamber and is somewhat lower than that in said condenser in said upper chamber, and second means for automatically adjusting the quantity of the absorbent solution added into the device in response to the outlet temperaure of the fluid flowing hrough said evaporator in said lower chamber in heat transfer relationship with the refrigerant.

2. A device, as set forth in claim 1, wherein said housing arranged to contain a supply of the refrigerant in the bottom portion of the lower chamber thereof, said second means comprising a passageway connected at one end to the bottom portion of said housing and at its other end to said generator section of said upper chamber, a valve located in said passageway for regulating the flow of the refrigerant therethrough, a sensing device located at the outlet from said first means in said evaporator section of said housing for determining the outlet temperature of the fluid which flows through said evaporator in indirect heat transfer relationship with the refrigerant, and a second valve located at the outlet from said first means in said generator section of said housing for adjusting the quantity of fluid discharged from said generator after flowing therethrough in indirect heat transfer relationship with the refrigerant.

3. A device, as set forth in claim 2, wherein a heat exchanger enclosing a portion of said passageway for supplying the refrigerant into said generator section from the bottom portion of said housing, duct means for passing the refrigerant to said heat exchanger from said generator section of said housing after its passage in indirect heat transfer relationship with another fluid therein, and for removing the refrigerant from said heat exchanger after its passage therethrough in indirect heat transfer relationship with the refrigerant flowing through said passageway, a branch passageway connected to said passageway upstream from said heat exchanger for supplying refrigerant into said absorber section of said housing, said branch passageway being connected to said duct means downstream from the outlet from said heat exchanger for mixture with the refrigerant from said heat exchange prior to supplying the mixed refrigerant into said absorber section, and a pump located in said passageway for circulating the refrigerant through said passageway and branch passageway.

4. A device, as set forth in claim 2, wherein third means being in communication with said concentration adjusting condenser and said evaporator section of said lower chamber for receiving refrigerant from said concentration adjusting condenser and for supplying the refrigerant into said evapoator section of said lower chamber, and fourth means communicating between said third means and said evaporator section of said lower chamber for accumulating the refrigerant and for supplying the refrigerant into the upper end of said lower chamber.

5. A device, as set forth in claim 4, wherein said third means comprises a leveling tank spaced from said housing, a duct interconnecting said concentration adjusting condenser and said leveling tank for supplying refrigerant from said condenser into said tank, and a seal pipe interconnecting said leveling tank and said evaporator section of said lower chamber for supplying refrigerant thereto.

6. A device, as set forth in claim 5, wherein said fourth means comprises an accumulating tank spaced outwardly from said housing, a conduit interconnecting said leveling tank and said accumulating tank, said accumulating tank arranged to have a variable liquid level therein, and an overflow pipe interconnecting said accumulating tank and the upper portion of said evaporator section of said lower chamber for supplying refrigerant thereto when the liquid level within the said accumulating tank rises to the level of said overflow pipe.

7. A device, as set forth in claim 1, wherein said first means comprises a plurality of heat exchange tubes arranged within each of said evaporator, absorber, generator, and condenser for flowing cooling water through said tubes in said evaporator absorber and condenser and steam through said heat exchange tubes in said generator in indirect heat transfer relationship with the refrigerant flowing over the exterior of said heat exchange tubes.

8. A device, as set forth in claim 5, wherein wall means form a reservoir within the lower portion of said lower chamber and located above the supply of refrigerant contained in the bottom of said lower chamber, said reservoir being arranged to receive refrigerant through said pipe from said leveling tank, said wall means being arranged to provide an overflow arrangement whereby as the supply of refrigerant fills said reservoir the refrigerant oveflows said wall means and enters the supply of refrigerant in the bottom of said lower chamber.

9. A device, as set forth in claim 8, wherein a conduit connected to said reservoir and extending therefrom into the upper end of said lower chamber for supplying refrigerant thereto, a pump located within said conduit for circulating the refrigerant from said reservoir to the upper portion of said evaporator section in said lower chamber.

10. A device, as set forth in claim 9, wherein a pipe connected to said condenser section of said upper chamber at one end and to said leveling tank at the other end for supplying refrigerant from said condenser into said leveling tank, and a branch pipe connected to said conduit extending between said reservoir and the upper end of said evaporator section in said lower chamber being connected to said pipe extending between said condenser and leveling tank for supplying refrigerant from said reservoir into said pipe.

11. A device, as set forth in claim 1, wherein heat exchange tubes being located within said concentration adjusting condenser and said heat exchange tubes therein having a smaller heat transfer area than said heat exchange tubes within said condenser, and passageways means for supplying fluid to said heat exchange tubes within said concentration adjusting condenser from said heat exchange tubes in said absorber.

12. A device, as set forth in claim 11, wherein a pipe connecting said condenser section of said upper chamber with said concentration adjusting condenser, an orifice located within said pipe for condensing at least a portion of the refrigerant flowing therethrough into said concentration adjusting condenser.

13. A device, as set forth in claim 8, wherein a duct connected at one end to said condenser in said upper chamber and at its opposite end to said reservoir within said lower chamber for flowing refrigerant after its passage over said heat exchange tubes in said condenser into said reservoir.

References Cited

UNITED STATES PATENTS

| | | | |
|---|---|---|---|
| 3,138,938 | 6/1964 | Beardslee | 62—141 |
| 3,141,307 | 7/1964 | Beardslee | 62—141 |
| 3,374,644 | 3/1968 | Foster | 62—141 |

LLOYD L. KING, Primary Examiner

U.S. Cl. X.R.

62—476